United States Patent
Saiga et al.

(10) Patent No.: US 9,535,237 B2
(45) Date of Patent: Jan. 3, 2017

(54) ZOOM LENS AND IMAGE PICKUP APPARATUS INCLUDING THE SAME

(71) Applicant: CANON KABUSHIKI KAISHA, Tokyo (JP)

(72) Inventors: Takeyoshi Saiga, Tokyo (JP); Kazuhiko Kajiyama, Utsunomiya (JP); Masatsugu Nakano, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/878,099

(22) Filed: Oct. 8, 2015

(65) Prior Publication Data
US 2016/0139376 A1    May 19, 2016

(30) Foreign Application Priority Data

Nov. 17, 2014   (JP) .................................. 2014-232491

(51) Int. Cl.
| | | |
|---|---|---|
| G02B 15/14 | (2006.01) |
| G02B 13/14 | (2006.01) |
| G02B 15/173 | (2006.01) |
| H04N 5/225 | (2006.01) |
| H04N 5/232 | (2006.01) |

(52) U.S. Cl.
CPC .......... *G02B 13/146* (2013.01); *G02B 15/173* (2013.01); *H04N 5/2254* (2013.01); *H04N 5/23296* (2013.01)

(58) Field of Classification Search
CPC ..... G02B 13/146; G02B 15/173; G02B 15/17; G02B 15/24; G02B 15/26; G02B 9/36; H04N 5/23296; H04N 5/2254
See application file for complete search history.

(56) References Cited

U.S. PATENT DOCUMENTS

| 8,670,187 B2 | 3/2014 | Mitsuhashi | |
|---|---|---|---|
| 8,797,657 B2 | 8/2014 | Mitsuhashi | |
| 2010/0238566 A1* | 9/2010 | Inomoto | G02B 15/173 |
| | | | 359/688 |

FOREIGN PATENT DOCUMENTS

| JP | 02126213 A | 5/1990 |
|---|---|---|
| JP | 2009204655 A | 9/2009 |
| JP | 2011053526 A | 3/2011 |
| JP | 2013088782 A | 5/2013 |
| JP | 2013171207 A | 9/2013 |

* cited by examiner

*Primary Examiner* — Joseph P Martinez
(74) *Attorney, Agent, or Firm* — Rossi, Kimms & McDowell LLP

(57) ABSTRACT

Provided is a zoom lens, comprising, in order from an object side to an image side: a first lens unit having a positive refractive power; a second lens unit having a negative refractive power; a third lens unit having a negative refractive power; and a fourth lens unit having a positive refractive power. The second lens unit and the third lens unit are configured to move along loci different from each other during zooming. At least one lens unit of the first lens unit, the second lens unit, the third lens unit, or the fourth lens unit includes a positive lens and a negative lens that are arranged adjacent to each other, and materials for the positive lens and the negative lens are appropriately set, respectively.

8 Claims, 7 Drawing Sheets

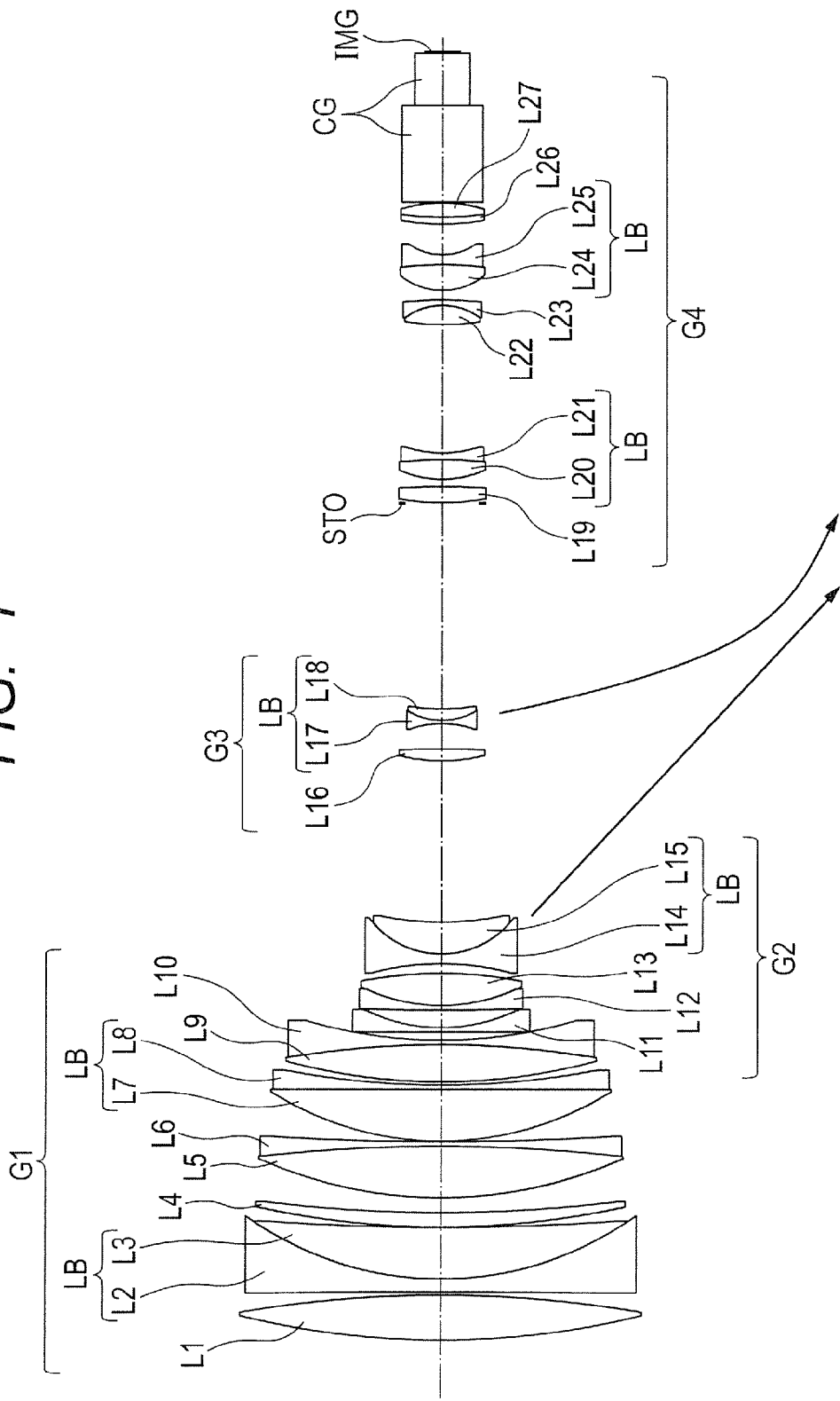

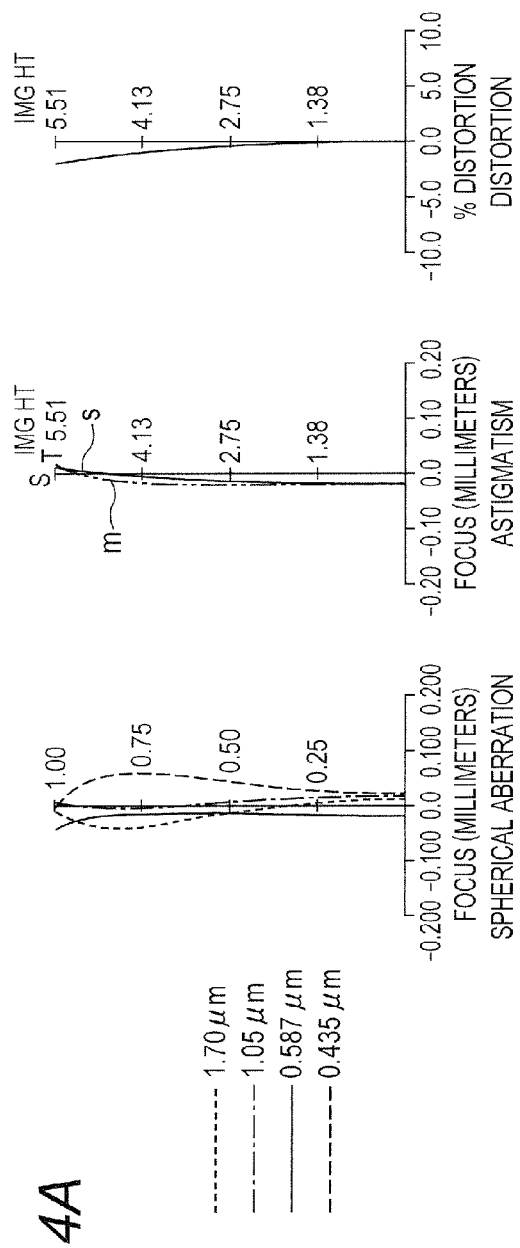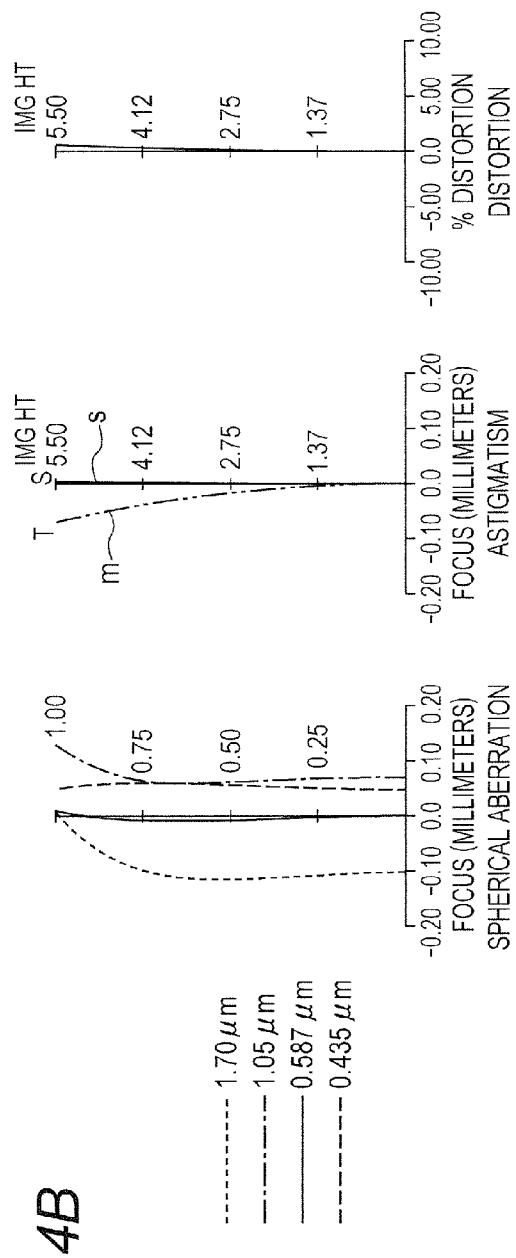
FIG. 4A
FIG. 4B

ZOOM LENS AND IMAGE PICKUP APPARATUS INCLUDING THE SAME

BACKGROUND OF THE INVENTION

Field of the Invention

The present invention relates to a zoom lens, and more particularly, to a zoom lens suitable as an image pickup optical system to be used in an image pickup apparatus, such as a monitoring camera, a digital camera, a video camera, and a broadcasting camera.

Description of the Related Art

In recent years, as an image pickup optical system to be used in an image pickup apparatus, a zoom lens is required to have a high zoom ratio and a small overall system size. For example, as an image pickup optical system for a monitoring camera, the zoom lens is required to have a small overall system size and a high zoom ratio, and is also required that favorable optical characteristics can be obtained in imaging during daytime and at night.

In general, in most cases, a monitoring camera uses visible light in imaging during daytime, and uses near-infrared light in imaging at night. The use of near infrared light provides an advantage in that imaging can be carried out with less influence of scattering than when visible light is used for example, in a dense fog with low visibility. Thus, it is demanded that the zoom lens to be used in a monitoring camera be corrected for an aberration in a broad wavelength range from at visible range to a near infrared range. In addition, it is demanded that the zoom lens to be used in border surveillance or the like be, due to its applications such as monitoring a broad range and determining distant ships, a bright zoom lens that has a high zoom ratio and is favorably corrected for various aberrations across the visible range to the near-infrared range.

Hitherto, there is known a zoom lens suitable for use in a monitoring camera, which has a high zoom ratio and is corrected for various aberrations across a visible range to a near-infrared range. In each of Japanese Patent Application Laid-Open No. H02-126213 and Japanese Patent Application Laid-Open to 2009-204655, there is disclosed zoom lens having a high zoom ratio. This zoom lens includes, in order from an object side to an image side, first to fourth Lens units having positive, negative, negative, and positive refractive powers, and an interval between adjacent lens units is changed during zooming.

In the zoom lens for a monitoring camera, near-infrared light is used in most cases in imaging at night. However, there are cases where a sufficient amount of light cannot be obtained from the near-infrared light, for example, when there is very little moonlight around the time of a new moon and when the moon is hidden by a cloud. Light called nightglow (peak wavelength of 1.6 μm) is emitted when hydroxide ions in an atmosphere are excited by the sunlight. With the use of this light, favorable imaging can be achieved with ease even when there is little moonlight.

In general, near-infrared light has a feature of being less affected by scattering than visible light. Accordingly, the use of nightglow facilitates the imaging of a subject even under poor environments such as poor weather and dusty atmosphere. The nightglow, however, has a wavelength width from wavelength of 1.0 μm to a wavelength of 1.7 μm. Accordingly, when the nightglow is used for imaging, various aberrations, in particular, an axial chromatic aberration needs to be favorably corrected in a wavelength range up to near-infrared light including nightglow. With use of a zoom lens not corrected for such aberrations, high optical characteristics are not obtained.

In the zoom lenses disclosed in Japanese Patent Application Laid-Open No. H02-126213 and Japanese Patent Application Laid-Open No. 2009-204655, the zoom ratio is high and the aberrations are favorably corrected across a visible range to a near-infrared range. However, the chromatic aberration is not necessarily corrected enough up to the near-infrared range of a wavelength of 1.7 μm. Accordingly, when imaging is performed with use of nightglow, it is difficult to obtain high optical characteristics. In the zoom lens for a monitoring camera, in order to obtain favorable optical characteristics over a broad wavelength range from the visible range to the near-infrared range of a wavelength of approximately 1.7 μm while achieving a higher zoom ratio, it is important to appropriately set the zoom type and the lens configuration of each lens unit.

SUMMARY OF THE INVENTION

According to one embodiment of the present invention, there is provided a zoom lens, comprising, in order from an object side to an image side: a first lens unit having a positive refractive power; a second lens unit having a negative refractive power; a third lens unit having a negative refractive power; and a fourth lens unit having a positive refractive power, the second lens unit and the third lens unit being configured to move along loci different from each other during zooming so that an interval between adjacent lens units is changed, in which at least one lens unit of the first lens unit, the second lens unit, the third lens unit, or the fourth lens unit includes a positive lens and a negative lens that are arranged adjacent to each other, and in which materials for the positive lens and the negative lens satisfy the following conditional expression:

$$-0.0015 \leq (\theta IRP - \theta IRN)/(\nu IRP - \nu IRN) < 0.0150$$

where, when a refractive index of a lens material at a wavelength of 400 nm is N400, a refractive index of a lens material at a wavelength of 1,050 nm is N1050, a refractive index of a lens material at a wavelength of 1,700 nm is N1700, and an Abbe number νIR and a partial dispersion ratio θIR of a lens material are νIR=(N1050−1)/(N400−N1700) and θIR=(N400−N1050)/(N400−N1700), respectively, νIRP and θIRP represent an Abbe number and a partial dispersion ratio of the material for the positive lens, respectively, and νIRN and θIRN represent an Abbe number and a partial dispersion ratio of the material for the negative lens, respectively.

In addition, according to one embodiment of the present invention, there is provided a zoom lens, comprising, in order from an object side to an image side: a first lens unit having a positive refractive power; a second lens unit having a negative refractive power; a third lens unit having a negative refractive power; and a fourth lens unit having a positive refractive power, the second lens unit and the third lens unit being configured to move along loci different from each other during zooming so that an interval between adjacent lens units is changed, in which the following conditional expression is satisfied:

$$-0.005 < (F1L - F1M)/F1M < 0.005$$

where F1M represents a focal length of the first lens unit at a wavelength of 1,050 nm, and F1L represents a focal length of the first lens unit at a wavelength of 1,700 nm.

BRIEF DESCRIPTION OF THE DRAWINGS

FIG. 1 is a lens cross-sectional view of a zoom lens at a wide angle end according to Example 1 of the present invention.

FIG. 4A is a diagram for showing aberrations at the wide angle end of the zoom lens of Example 2.

FIG. 4B is a diagram for showing aberrations at a telephoto end of the zoom lens of Example 2.

DESCRIPTION OF THE EMBODIMENTS

Now, exemplary embodiments or the present invention are described with reference to the drawings. A zoom lens of the present invention includes, in order from an object side to an image side, a first lens unit having a positive refractive power, a second lens unit having a negative refractive power, a third lens unit having a negative refractive power, and a fourth lens unit having a positive refractive power. During zooming, the second lens unit and the third lens unit are configured to move along loci different from each other. In addition, an interval between adjacent lens units is changed.

Figure 2A:
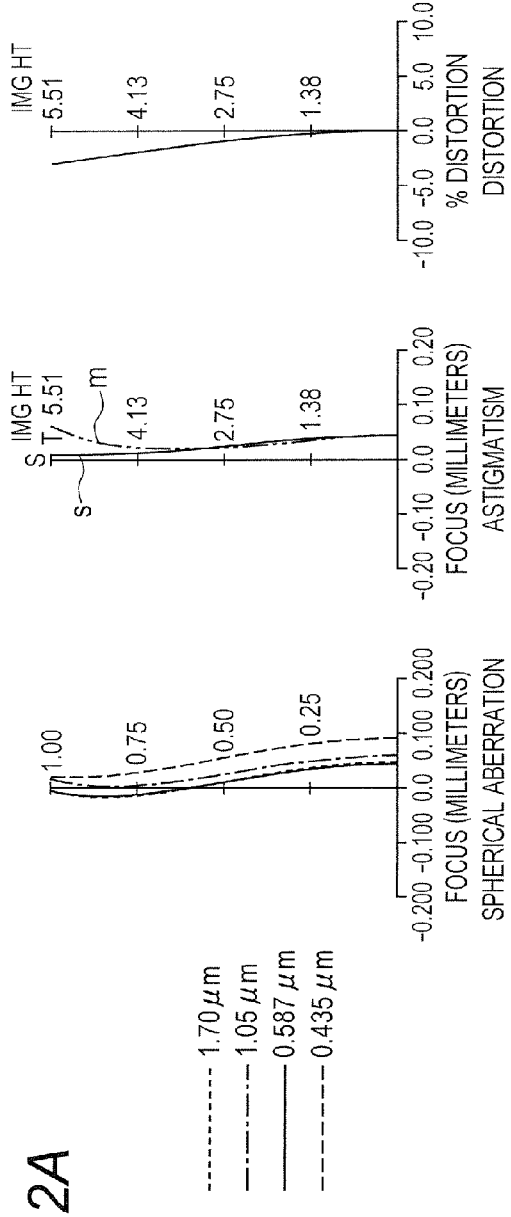
FIG. 2A is a diagram for showing aberrations at the wide angle end of the zoom lens of Example 1.
Figure 2B:
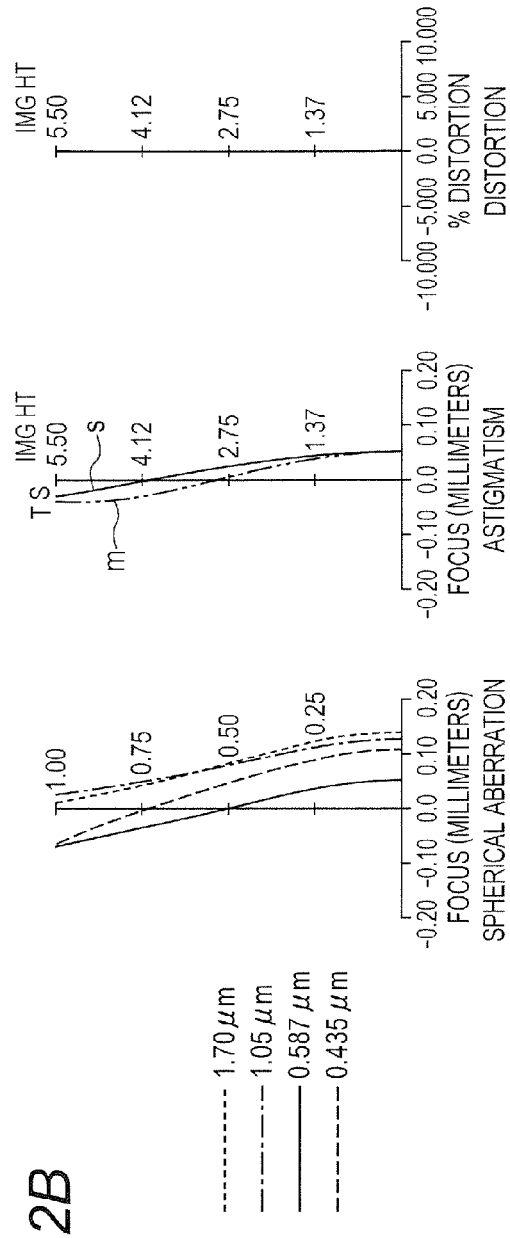
FIG. 2B is a diagram for showing aberrations at a telephoto end of the zoom lens of Example 1.
Figure 3:
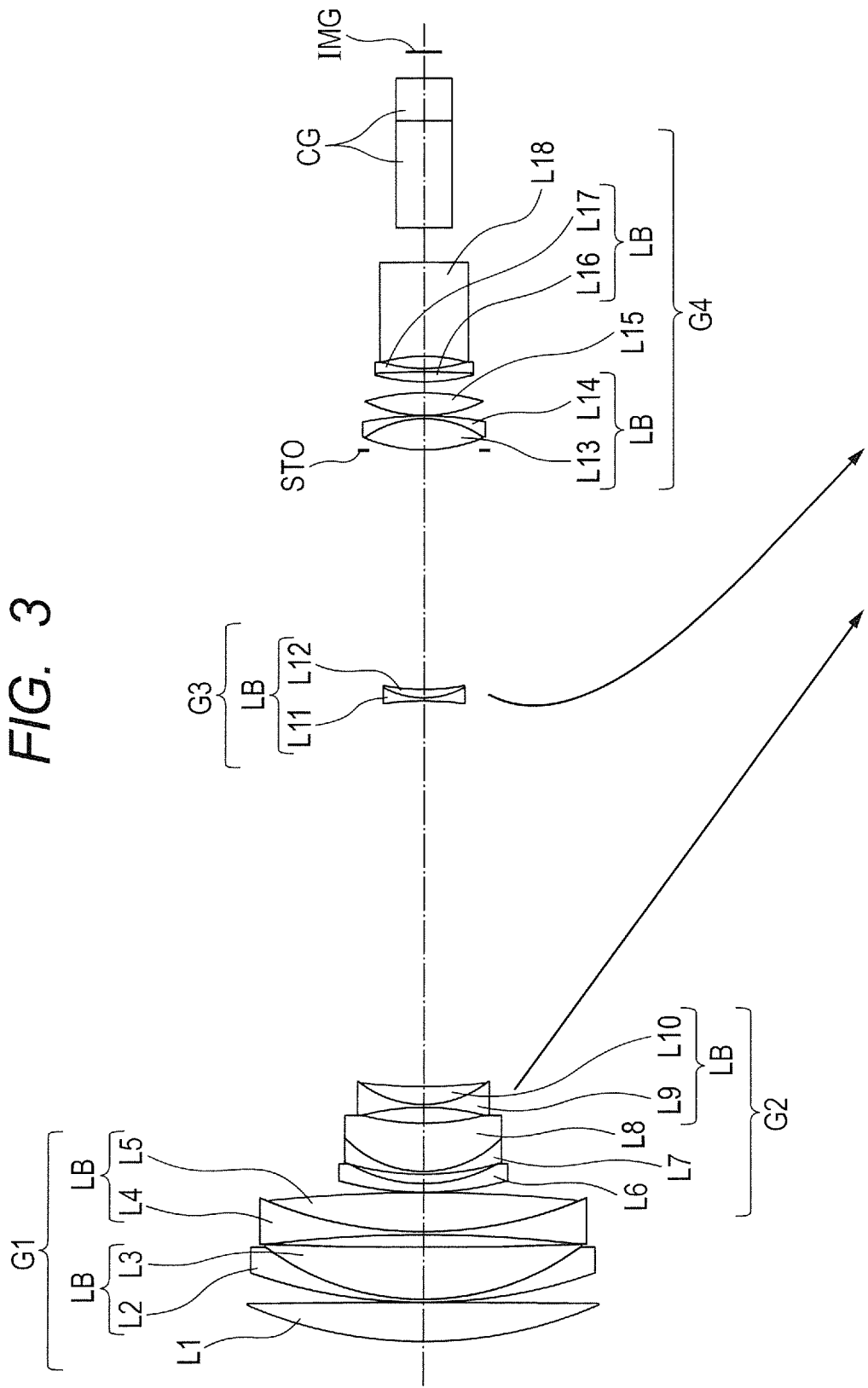
FIG. 3 is a lens cross-sectional view of a zoom lens at a wide angle end according to Example 2 of the present invention.

FIG. 1 is a lens cross-sectional view of a zoom. lens at a wide angle end (short focal length end) according to Example 1 of the present invention. FIGS. 2A and 2B are aberration diagrams of the zoom lens of Example 1 at the wide angle end and a telephoto end (long focal length end), respectively. The zoom ratio of Example 1 is 20.0, and a wavelength range in which the zoom lens is corrected for aberrations is from a wavelength of 400 nm to a wavelength of 1,700 nm. FIG. 3 is a lens cross-sectional view at the wide angle end of a zoom lens according to Example 2 of the present invention. FIGS. 4A and 4B are aberration diagrams of the zoom lens of Example 2 at the wide angle end and the telephoto end, respectively. The zoom ratio is 19.5, and a wavelength range in which the zoom lens is corrected for aberrations is from a wavelength of 400 nm to a wavelength of 1,700 nm.

Figure 5:
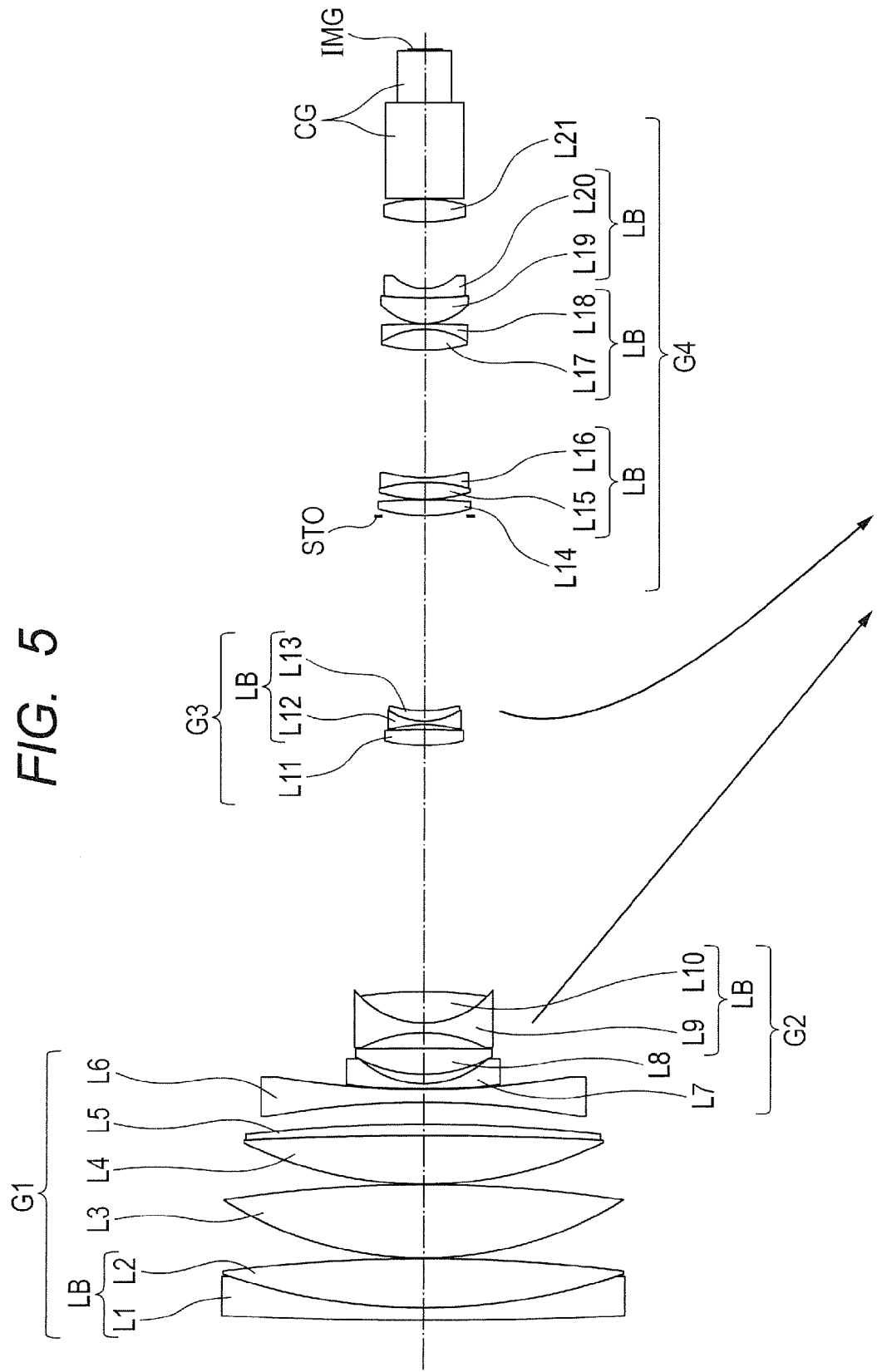
FIG. 5 is a lens cross-sectional view of a zoom lens at a wide angle end according to Example 3 of the present invention.
Figure 6A:
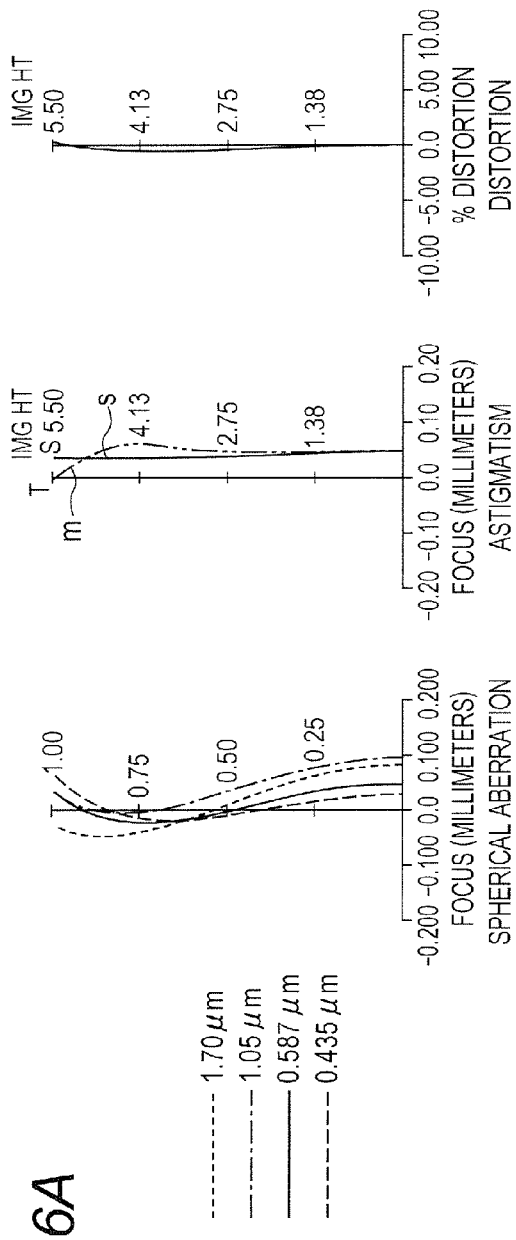
FIG. 6A is a diagram for showing aberrations at the wide angle end of the zoom lens of Example 3.
Figure 6B:
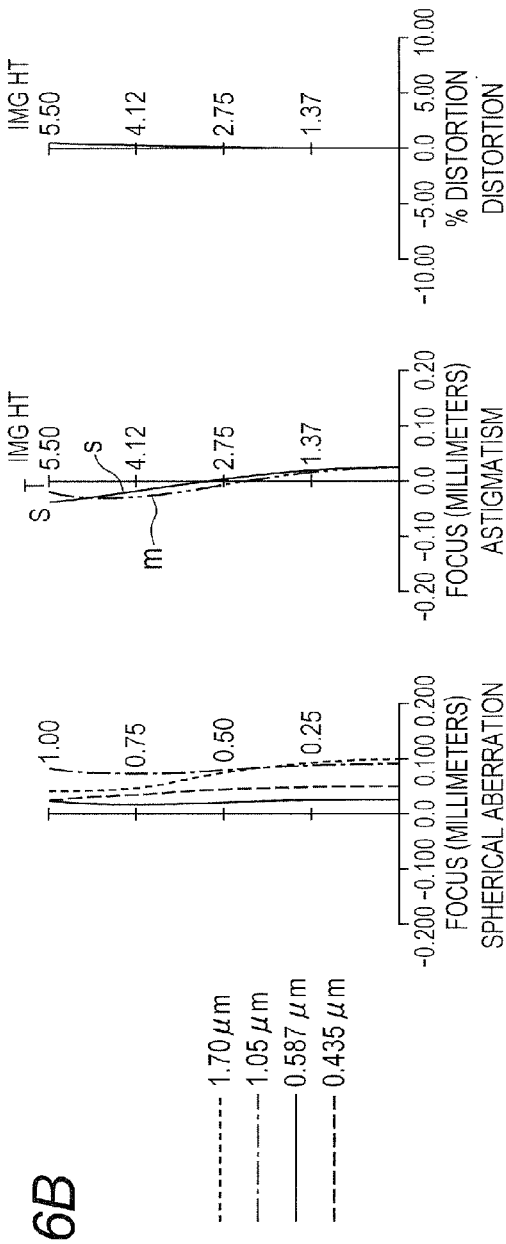
FIG. 6B is a diagram for showing aberrations at a telephoto end of the zoom lens of Example 3.
Figure 7:
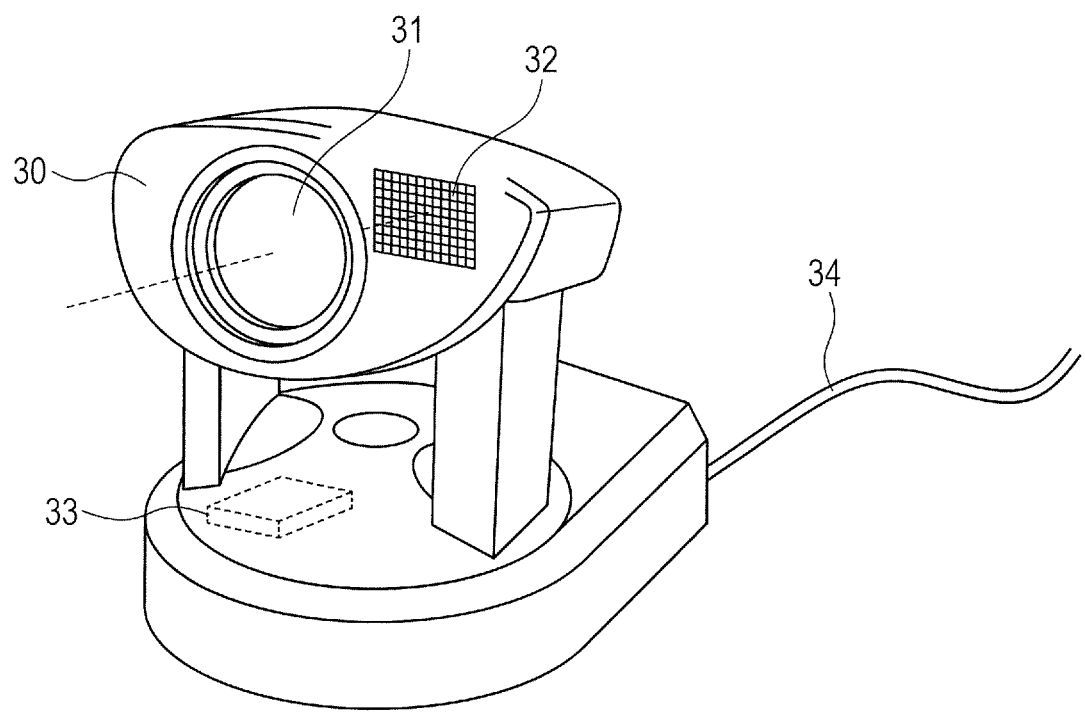
FIG. 7 is a schematic view of a main part of a monitoring camera (image pickup apparatus) according to the present invention.

FIG. 5 is a lens cross-sectional view of a zoom lens at the wide angle end according to Example 3 of the present invention. FIGS. 6A and 6B are aberration diagrams of the zoom lens of Example 3 at the wide angle end and the telephoto end, respectively. The zoom ratio is 19.8, and a wavelength range in which the zoom lens is corrected for aberrations is from a wavelength of 400 am to a wavelength of 1,700 nm. FIG. 7 is a schematic view of a main part of image pickup apparatus according to the present invention. The zoom lens according to each of the examples is used in the image pickup apparatus.

In the lens cross-sectional views, the left side corresponds to the object side (front side), and the right side corresponds to the image side (rear side). In the lens cross-sectional views, a first lens unit G1 has a positive refractive power, a second lens unit G2 has a negative refractive bower, a third lens unit G3 has a negative refractive power, and a fourth lens unit G4 has positive refractive power. An F number determination member (hereinafter referred to also as "aperture stop") STO has a function of aperture stop for determining (limiting) a maximum F number (Fno) light flux. An optical block CG corresponds to an optical filter, a face plate, a crystal low pass filter, an infrared cut filter or the like.

As an image plane IMG, an image pickup surface of a solid-state image pickup element (photo-electric conversion element) such as a CCD sensor and a CMOS sensor is arranged when the zoom lens is used as an image pickup optical system of a video camera and a digital still camera. The arrows indicate movement loci of the respective lens units during zooming from the wide angle end to the telephoto end.

In each of the examples, focusing from infinity to a near field is carried out by feeding out the first lens unit G1 toward the object side. An aberration diagram is shown by representing each of numerical examples which are described later in units of millimeters. In spherical aberration diagram, aberrations at a wavelength of 1,700 nm, (1.70 μm), a wavelength of 1,050 nm (1.05 μm), a wavelength of 587 nm (0.587 μm) (d-line), and a wavelength of 435 nm (0.435 μm) (g-line) are indicated, in an astigmatism diagram, symbol m represents a meridional image plane of the d-line, and symbol s represents a sagittal image plane of the d-line.

Note that, in the following examples, the wide angle end and the telephoto end refer to zoom positions obtained when a lens unit for varying the magnification (second lens unit G2) is located at respective ends of a range on a mechanism in which the stated lens unit can move along an optical axis. Unless otherwise indicated, the description is herein based on a premise that the lens structures are arranged in order from the object side to the image side.

The zoom lens according to the present invention includes, in order from the object side to the image side; the first lens unit G1 having a positive refractive power; the second lens unit G2 having a negative refractive power; the third lens unit G3 having a negative refractive power, and the fourth lens unit G4 having a positive refractive power. The second lens unit G2 is configured to linearly move from the object side toward the image side along the optical axis during zooming from the wide angle end to the telephoto end. The third lens unit G3 is configured to non-linearly move from the object side toward the image side.

At least one lens unit of the first lens unit G1 to the fourth lens unit G4 includes a lens pair LB of a positive lens LP and a negative lens LN that are arranged adjacent to each other. A refractive index of a lens material at a wavelength of 400 nm is N400, a refractive index of a lens material at a wavelength of 1,050 nm is N1050, and a refractive index of a lens material at a wavelength of 1,700 nm is N1700. An Abbe number vIR of a lens material and a partial dispersion ratio θIR thereof are vIR=(N1050−1)/(N400−N1700) and θIR=(N400−N1050)/(N400−N1700), respectively.

An Abbe number and a partial dispersion ratio of a material for the positive lens LP are represented by vIRP and θIRP, respectively, and an Abbe number and a partial dispersion ratio of a material for the negative, lens LN are represented by vIRN and θIRN, respectively. At this time, the following conditional expression is satisfied.

$$-0.0015 < (\theta IRP - \theta IRN)/(vIRP - vIRN) < 0.0150 \quad (1)$$

Conditional Expression (1) represents an index of a secondary spectrum of an axial chromatic aberration generated at a wavelength of 1,050 nm, which is generated when axial chromatic aberrations at a wavelength of 400 nm and a wavelength of 1,700 nm are corrected by the positive lens LP and the negative lens LN.

The index of the secondary spectrum of the axial chromatic aberration represented by Conditional Expression (1), which corrects the axial chromatic aberrations by the lens pair LB of the positive lens LP and the negative lens LN with the use of a general optical material, has a negative value. Accordingly, the secondary spectrum of the axial chromatic aberration is canceled out when the lens pair LB of the positive lens LP and the negative lens LN, which has the value close to the upper limit of Conditional Expression (1), is arranged in the lens unit in which the axial chromatic aberration is corrected by a general material. As a result, the axial chromatic aberration can be corrected favorably across a broad wavelength range from a visible range to a near-infrared range.

Further, when the lens pair LB of the positive lens LP and the negative lens LN, which has the value close to the lower limit of Conditional Expression (1), is arranged, the index of the secondary spectrum of the axial chromatic aberration is reduced. Accordingly, the secondary spectrum of the axial chromatic aberration can be reduced to favorably correct the axial chromatic aberration across a broad wavelength range from the visible range to the near-infrared range. In addition, in the zoom lens of the present invention, it is preferred that the lens pair LB satisfying Conditional Expression (1) be arranged in at least one lens unit among the lens units arranged on the object side of the aperture stop STO and in at least one lens unit among the lens units arranged on the image side of the aperture stop STO.

In the zoom lens of the present invention, the lenses arranged on the object side of the aperture stop STO greatly affect the axial chromatic aberration on the telephoto side, and the lenses arranged on the image side of the aperture stop STO greatly affect the axial chromatic aberration on the wide angle side. Accordingly, at least one lens pair LB satisfying Conditional Expression (1), which is made up of a positive lens and a negative lens that are adjacent to each other, is arranged on the object side of the aperture stop STO and on the image side of the aperture stop STO. Thus, even in a zoom lens having a high zoom ratio, the axial chromatic aberration is favorably corrected across a broad wavelength range from the visible range to the near-infrared range.

In addition, in the zoom lens of the present invention, it is preferred that at least one lens pair LB satisfying Conditional Expression (1), which is made up of a positive lens and a negative lens that are adjacent to each other, be arranged in each of the first lens unit G1 to the fourth lens unit G4. When at least one lens pair LB satisfying Conditional Expression (1), which is made up of a positive lens and a negative lens that are adjacent to each other, is arranged in each lens unit, the axial chromatic aberration generated by each lens unit is favorably corrected with ease. Consequently, axial chromatic aberration is more favorably corrected, with ease across a broad wavelength range from the visible range to the near-infrared range as a whole.

As described above, according to the present invention, a zoom lens having a high zoom ratio, which has favorable imaging performance for light in a very broad wavelength range from the visible range the near infrared range, in particular, to a peak of nightglow of 1.5 μm, is obtained.

It is preferred in the present invention to satisfy at least one of the following conditional expressions. The focal length of the first lens unit at a wavelength of 1,050 nm is represented by F1M, and the focal length of the first lens unit at a wavelength of 1,700 nm is represented by F1L. The focal length of the zoom lens at the telephoto end at a wavelength of 1,050 nm is represented by FTM.

At this time, it is preferred to satisfy at least one of the following conditional expressions.

$$-0.005 < (F1L - F1M)/F1M < 0.005 \qquad (2)$$

$$0.3 < F1M/FTM < 0.8 \qquad (3)$$

When Conditional Expression (2) is satisfied, the axial chromatic aberration at the telephoto end is favorably corrected across a broad wavelength range from the visible range to the near-infrared range. Conditional Expression (2) is an index for estimating the amount of axial chromatic aberration in the near-infrared range generated by the first lens unit G1. When the ratio falls below the lower limit or exceeds the upper limit of Conditional Expression (2), the secondary spectrum of the axial chromatic aberration is generated in a large amount at the telephoto end by the first lens unit G1, and the imaging performance deteriorates.

Conditional Expression (3) relates to the ratio of the focal length of the first lens unit G1 to the focal length of the zoom lens at the telephoto end at a wavelength of 1,050 nm. When the ratio falls below the lower limit of Conditional Expression (3), the focal length of the first lens unit G1 becomes too short, and it becomes difficult to correct various aberrations. In addition, when the ratio exceeds the upper limit of Conditional Expression (3), the focal length of the first lens unit G1 is increased to increase the total lens length (length from the first lens surface to the image plane), and it becomes difficult to reduce the size of the zoom lens.

Further, another zoom lens of the present invention includes, in order from the object side to the image side, a first lens unit having a positive refractive power, and a second lens unit G2 having a negative refractive power, which is configured to move in the optical axis direction in order to vary the magnification. The zoom lens further includes a third lens unit G3 having a negative refractive power, which is configured to move in the optical axis direction in order to correct a focus shift generated by the magnification varying, and a fourth lens unit G4 having a positive refractive power. The another zoom lens of the present invention has feature of satisfying Conditional Expression (2). When Conditional Expression (2) is satisfied under the above-mentioned configuration, the axial chromatic aberration at the telephoto end can be favorably corrected across a broad wavelength range from the visible range to the near-infrared range as described above.

Note that, the first lens unit, the second lens unit, the third lens unit, and the fourth lens unit may be configured to move during zooming. As described above, according to the present invention, a zoom lens having high optical characteristics, which is reduced in various aberrations across broad wavelength range from the visible range to the near-infrared range, is obtained.

Next, the lens structure of the zoom lens in each of the examples is described.

Example 1

The structure of the zoom lens of Example 1 is described. As illustrated in FIG. 1, the zoom lens of Example 1 includes the first lens unit G1 having a positive refractive power, the second lens unit G2 having a negative refractive power, the third lens unit G3 having a negative refractive power, the aperture stop STO that determines a predetermined aperture, and the fourth lens unit G4 having a positive refractive power. The optical block CG is arranged between the fourth lens unit G4 and the image plane IMG. If this optical block CG is not necessary, the optical block CG can be omitted.

In the following, symbol Li represents the i-th lens counted in order from the object side to the image side. The first lens unit G1 includes a lens having a positive refractive power (hereinafter referred to as a positive lens L1, a positive lens L3, a positive lens L4, a positive lens L5, a positive lens L7, a positive lens L9, a lens having a negative refractive power (hereinafter referred to as "negative lens") L2, a negative lens L6, a negative lens L8, and a negative lens L10. The negative lens L2 and the positive lens L3 are cemented, the positive lens L1 and the negative lens L6 are cemented, the positive lens L7 and the negative lens L8 are cemented, and the positive lens L9 and the negative lens L10 are cemented.

The second lens unit G2 includes a positive lens L13, a positive lens L15, a negative lens L11, a negative lens L12, and a negative lens L14. The negative lens 112 and the positive lens L3 are cemented, and the negative lens L14 and the positive lens L5 are cemented. The third lens unit G3 includes a positive lens L6, a positive lens L18, and a negative lens L17. The negative lens L17 and the positive lens L18 are cemented. In addition, an aspherical surface is used for the positive lens L16.

The fourth lens unit G4 includes a positive lens L19, a positive lens L20, a positive lens L22, a positive lens L24, a positive lens L26, a positive lens L27, negative lens L21, a negative lens L23, and a negative lens L25. The positive lens L20 and the negative lens L21 are cemented, the positive lens L22 and the negative lens L23 are cemented, the positive lens L24 and the negative lens L25 are cemented, and the positive lens L26 and the positive lens L27 are cemented.

During zooming, the second lens unit G2 and the third lens unit G3 are configured to move in the optical axis direction. Specifically, when the second lens unit G2 is moved along the optical axis, the magnification is varied, and a variation in the image plane associated therewith is corrected by moving the third lens unit G3. In each lens unit, the lenses and the values corresponding to Conditional Expressions (1) to (3) are as indicated in Table 1.

Example 2

The structure of the zoom lens of Example 2 is described. The sign of the refractive power of each lens unit, the movement of each lens unit during zooming, and the like are the same as in Example 1. The first lens unit G1 includes a positive lens L1, a positive lens L3, a positive lens a negative lens L2, and a negative lens L4. The negative lens L2 and the positive lens L3 are cemented, and the negative lens L4 and the positive lens L5 are cemented.

The second lens unit G2 includes a positive lens L8, a positive lens L10, a negative lens L6, a negative lens L7, and a negative lens L9. The negative lens L7 and the positive lens L8 are cemented, and the negative lens L9 and the positive lens L10 are cemented. The third lens unit G3 includes a positive lens L12 and a negative lens L11. The negative lens L11 and the positive lens L12 are cemented. In addition, an aspherical surface is used for the negative lens L11.

The fourth lens unit G4 includes a positive lens L13, a positive, lens L15, a positive lens L16, a negative lens L14, a negative lens L17, and a negative lens L18. The positive lens L13 and the negative lens L14 are cemented, and the positive lens L16 and the negative lens L17 are cemented. In addition, an aspherical surface is used for the positive lens L13 and the negative lens L18.

In each lens unit, the lenses and the values corresponding to Conditional Expressions (1) to (3) are as indicated in Table 1.

Example 3

The structure of the zoom lens of Example 3 is described. The sign of the refractive power of each lens unit, movement of each lens unit during zooming, and the like are the same as in Example 1. The first lens unit G1 includes a positive lens L1, a positive lens L3, a positive lens L4, a positive lens L5, a negative, lens L1 and a negative lens L6. The negative lens L1 and the positive lens L2 are cemented, and the positive lens L4 and the positive lens L5 are cemented.

The second lens unit G2 includes a positive lens L8, a positive lens L10, a negative lens L7, and a negative lens L9. The negative lens L9 and the positive lens L10 are cemented. In addition, an aspherical surface is used for the negative lens L7. The third lens unit G3 includes a positive lens L11, a positive lens L13, and a negative lens L12. The negative lens L12 and the positive lens L13 are cemented. In addition, an aspherical surface is used for the positive lens L11.

The fourth lens unit G4 includes a positive lens L14, a positive lens L15, a positive lens L17, a positive lens L19, a positive lens L21, a negative lens L16, a negative lens L18, and a negative lens L20. The positive lens L15 and the negative lens L16 are cemented, the positive lens L17 and the negative lens L18 are cemented, and the positive lens L19 and the negative lens L20 are cemented.

In each lens unit, the lenses and the values corresponding to Conditional Expressions (1) to (3) are as indicated in Table 1.

Although the exemplary examples of the present invention have been described so far, the present invention is by no means limited to those examples, and hence various changes and modifications can be made within the scope of the subject matter of the present invention. For example, the zoom lens corrected for the aberrations in a wavelength range from a wavelength of 400 nm to a wavelength of 1,700 nm has been described in the examples, but the correction wavelength range is not limited, and the present invention can be similarly applied to a zoom lens with a narrower or broader correction wavelength range.

Next, an example of a monitoring camera (image pickup apparatus) including the zoom lens of the present invention as an image pickup optical system is described with reference to FIG. 7. In FIG. 7, a monitoring camera main body 30 and an image pickup optical system 31 constructed with the zoom lens described in any one of Examples 1 to 3 are illustrated. A solid-state image pickup element 32 (photoelectric conversion element), such as a COD sensor and a CMOS sensor, is embedded in the camera main body and receives a subject image formed by the image pickup optical system 31. A memory 33 records information corresponding subject image subjected photoelectric conversion by the solid-state image pickup element 32. A network cable 34 is used to transfer the captured subject image subjected to photoelectric conversion by the solid-state image pickup element 32.

Now, numerical examples in the respective examples are shown. In each of the numerical examples, a surface number i is an optical surface counted in order from an object plane to an image plane. Symbol ri represents a curvature radius of the i-th optical surface. Symbol di represents an interval between the i-th optical surface and the (i+1)th optical surface (the positive sign is assigned when the interval is measured from the object side to the image plane side (when the light approaches), and the negative sign is assigned for the opposite direction). Symbols Ndi and vdi represent the refractive index and the Abbe number of the material at a wavelength of 587.6 nm (d-line) respectively. The focal length is a value at a wavelength of 587.6 nm.

The aspherical shape is expressed through a general aspherical expression as in the following expression. In the following expression, symbol Z represents a coordinate in the optical axis direction, symbol c represents a curvature (inverse of curvature radius r), symbol h represents a height from the optical axis, symbol k represents a conic constant, and symbols A, B, C, D, and E represent fourth order, sixth-order, eighth-order, tenth-order, and twelfth-order asperical coefficients, respectively.

$$Z = \frac{ch^2}{1 + \sqrt{(1+k)c^2h^2}} + Ah^4 + Bh^6 + Ch^8 + Dh^{10} + Eh^{12}$$

Expression [E-X] means $[10^{-X}]$. Symbol * means a surface having a spherical shape. In addition, a relationship between each of the conditional expressions described above and the numerical examples shown in Table 1.

Numerical Example 1

Surface data

| Surface number | r | d | Nd | vd |
|---|---|---|---|---|
| 1 | 252.11 | 14.02 | 1.487 | 70.2 |
| 2 | −354.71 | 1.00 | | |
| 3 | −4,425.8 | 4.00 | 1.697 | 55.5 |
| 4 | 101.32 | 15.97 | 1.439 | 94.9 |
| 5 | 725.87 | 0.15 | | |
| 6 | 257.41 | 4.47 | 1.439 | 94.9 |
| 7 | 440.87 | 1.00 | | |
| 8 | 134.30 | 16.06 | 1.439 | 94.9 |
| 9 | −489.94 | 1.40 | 1.622 | 53.2 |
| 10 | 839.95 | 0.15 | | |
| 11 | 96.14 | 16.04 | 1.439 | 94.9 |
| 12 | 98,516.58 | 1.40 | 1.516 | 64.1 |
| 13 | 249.40 | 4.65 | | |
| 14 | 177.17 | 11.56 | 1.564 | 60.7 |
| 15 | −283.29 | 1.40 | 1.487 | 70.2 |
| 16 | 144.63 | Variable | | |
| 17 | 5,928.48 | 1.50 | 1.883 | 40.8 |
| 18 | 52.79 | 5.46 | | |
| 19 | 913.53 | 1.40 | 1.497 | 81.5 |
| 20 | 54.52 | 10.00 | 1.801 | 35.0 |
| 21 | −128.30 | 3.00 | | |
| 22 | −82.35 | 3.00 | 1.497 | 81.5 |
| 23 | 27.41 | 10.00 | 1.487 | 70.2 |
| 24 | 92.90 | Variable | | |
| 25* | 60.80 | 3.64 | 1.532 | 48.8 |
| 26 | −292.08 | 7.85 | | |
| 27 | −28.02 | 1.00 | 1.497 | 81.5 |
| 28 | 20.26 | 3.50 | 1.487 | 70.2 |
| 29 | 51.97 | Variable | | |
| 30 (Stop) | ∞ | 0.15 | | |
| 31 | 79.58 | 5.00 | 1.618 | 63.3 |
| 32 | −182.09 | 2.24 | | |
| 33 | 31.98 | 6.00 | 1.497 | 81.5 |
| 34 | −121.13 | 2.13 | 1.487 | 70.2 |
| 35 | 36.16 | 40.00 | | |
| 36 | 73.58 | 5.99 | 1.439 | 94.9 |
| 37 | −18.19 | 1.60 | 1.801 | 35.0 |
| 38 | −114.35 | 3.00 | | |
| 39 | 20.23 | 8.00 | 1.497 | 81.5 |
| 40 | −96.19 | 3.00 | 1.540 | 59.5 |
| 41 | 17.49 | 9.49 | | |
| 42 | 67.03 | 2.24 | 1.564 | 60.7 |
| 43 | 88.79 | 4.45 | 1.801 | 35.0 |
| 44 | −42.25 | 0.15 | | |
| 45 | ∞ | 30.00 | 1.603 | 38.0 |
| 46 | ∞ | 16.20 | 1.516 | 64.1 |
| 47 | ∞ | 0.15 | | |

Aspherical surface data

| Surface number | | | |
|---|---|---|---|
| 25 | K = 0.00E+00 | A = 7.07E−06 | B = 2.71E−09 |
| | C = 8.50E−11 | D = −3.88E−13 | E = 7.77E−16 |

Various data

| | Wide angle end | Intermediate | Telephoto end |
|---|---|---|---|
| Focal length | 25 | 111.8 | 499.9 |
| Fno | 2.8 | 2.8 | 5 |
| Image height | 5.5 | 5.5 | 5.5 |
| d16 | 2.40 | 63.75 | 79.42 |
| d24 | 50.17 | 2.02 | 36.61 |
| d29 | 64.05 | 50.86 | 0.60 |

Numerical Example 2

Surface data

| Surface number | r | d | Nd | vd |
|---|---|---|---|---|
| 1 | 132.99 | 12.04 | 1.487 | 70.2 |
| 2 | −5,321.70 | 0.15 | | |
| 3 | 156.62 | 0.90 | 1.697 | 55.5 |
| 4 | 79.28 | 16.28 | 1.439 | 94.9 |
| 5 | 1,353.19 | 3.83 | | |
| 6 | −385.50 | 0.90 | 1.516 | 64.1 |
| 7 | 124.15 | 12.13 | 1.439 | 94.9 |
| 8 | −457.55 | Variable | | |
| 9 | 95.89 | 2.66 | 1.883 | 40.8 |
| 10 | 45.06 | 2.85 | | |
| 11 | 81.36 | 0.90 | 1.497 | 81.5 |
| 12 | 32.85 | 15.00 | 1.801 | 35.0 |
| 13 | 74.08 | 4.95 | | |
| 14 | −71.66 | 0.90 | 1.497 | 81.5 |
| 15 | 31.33 | 5.62 | 1.487 | 70.2 |
| 16 | 171.83 | Variable | | |
| 17* | −87.66 | 0.90 | 1.439 | 94.9 |
| 18 | 24.74 | 2.72 | 1.516 | 64.1 |
| 19 | 67.58 | Variable | | |
| 20 (Stop) | ∞ | 0.10 | | |
| 21* | 44.10 | 9.73 | 1.439 | 94.9 |
| 22 | −30.82 | 0.90 | 1.613 | 58.7 |
| 23 | −92.84 | 0.10 | | |
| 24 | 40.34 | 7.00 | 1.439 | 94.9 |
| 25 | −64.31 | 3.40 | | |
| 26 | 54.14 | 3.18 | 1.497 | 81.5 |
| 27 | −192.90 | 0.90 | 1.652 | 58.6 |
| 28 | 43.90 | 3.42 | | |
| 29 | −49.62 | 29.20 | 1.487 | 70.2 |
| 30* | −287.98 | 11.00 | | |
| 31 | ∞ | 33.00 | 1.608589 | 46.4 |
| 32 | ∞ | 13.20 | 1.517 | 64.2 |
| 33 | ∞ | 8.27 | | |

Aspherical surface data

| Surface number | | | |
|---|---|---|---|
| 17 | K = 0.00E+00 | A = −3.03E−07 | B = −2.16E−10 |
| | C = −1.78E−12 | D = −4.13E−14 | E = 0.00E+00 |

-continued

| | | | |
|---|---|---|---|
| 21 | K = 0.00E+00 | A = −1.62E−06 | B = −8.04E−10 |
| | C = 7.05E−13 | D = −3.55E−15 | E = 0.00E+00 |
| 30 | K = 0.00E+00 | A = 1.08E−05 | B = −3.12E−09 |
| | C = 1.43E−10 | D = −5.97E−13 | E = 0.00E+00 |

Various data

| | Wide angle end | Intermediate | Telephoto end |
|---|---|---|---|
| Focal length | 25 | 111.8 | 499.9 |
| Fno | 2.8 | 2.8 | 5.3 |
| Image height | 5.5 | 5.5 | 5.5 |
| d8 | 0.10 | 118.29 | 157.01 |
| d16 | 119.62 | 1.01 | 35.87 |
| d19 | 74.13 | 74.55 | 0.98 |

Numerical Example 3

Surface data

| Surface number | r | d | Nd | νd |
|---|---|---|---|---|
| 1 | 1,310.28 | 4.00 | 1.741 | 52.6 |
| 2 | 185.45 | 15.42 | 1.439 | 94.9 |
| 3 | −491.24 | 0.15 | | |
| 4 | 114.03 | 22.92 | 1.439 | 94.9 |
| 5 | −414.75 | 0.15 | | |
| 6 | 124.71 | 15.28 | 1.439 | 94.9 |
| 7 | −1,081.75 | 3.65 | 1.720 | 34.7 |
| 8 | −463.20 | 6.85 | | |
| 9 | −259.08 | 4.00 | 1.741 | 52.6 |
| 10 | 259.49 | Variable | | |
| 11* | 681.32 | 1.50 | 1.883 | 40.8 |
| 12 | 28.95 | 3.00 | | |
| 13 | 43.79 | 7.99 | 1.801 | 35.0 |
| 14 | −1,833.05 | 5.00 | | |
| 15 | −42.40 | 3.00 | 1.497 | 81.5 |
| 16 | 27.21 | 10.00 | 1.573 | 57.7 |
| 17 | −129.47 | Variable | | |
| 18* | 56.27 | 5.00 | 1.532 | 48.8 |
| 19 | −184.94 | 1.66 | | |
| 20 | −34.08 | 1.00 | 1.497 | 81.5 |
| 21 | 20.23 | 3.18 | 1.573 | 57.7 |
| 22 | 33.79 | Variable | | |
| 23 (Stop) | ∞ | 0.15 | | |
| 24 | 49.87 | 5.00 | 1.618 | 63.3 |
| 25 | −193.54 | 0.15 | | |
| 26 | 46.71 | 5.36 | 1.497 | 81.5 |
| 27 | −51.25 | 1.40 | 1.573 | 57.7 |
| 28 | 44.59 | 40.00 | | |
| 29 | 49.65 | 6.65 | 1.439 | 94.9 |
| 30 | −24.36 | 1.60 | 1.740999 | 52.6 |
| 31 | −215.43 | 0.15 | | |
| 32 | 18.44 | 8.00 | 1.497 | 81.5 |
| 33 | 136.43 | 3.00 | 1.540 | 59.5 |
| 34 | 14.45 | 20.93 | | |
| 35 | 51.73 | 7.00 | 1.564 | 60.7 |
| 36 | −44.51 | 0.15 | | |
| 37 | ∞ | 30.00 | 1.603 | 38.0 |
| 38 | ∞ | 16.20 | 1.516 | 64.1 |
| 39 | ∞ | 0.15 | | |

Aspherical surface data

| Surface number | | | |
|---|---|---|---|
| 11 | K = 0.00E+00 | A = 2.67E−06 | B = 4.88E−10 |
| | C = −1.72E−12 | D = 3.48E−15 | E = −3.08E−18 |
| 18 | K = 0.00E+00 | A = 7.37E−06 | B = 9.58E−09 |
| | C = −2.91E−11 | D = 5.44E−13 | E = −2.08E−15 |

Various data

| | Wide angle end | Intermediate | Telephoto end |
|---|---|---|---|
| Focal length | 25 | 111.6 | 495.6 |
| Fno | 2.8 | 2.8 | 5 |
| Image height | 5.5 | 5.5 | 5.5 |
| d10 | 0.28 | 86.16 | 112.20 |
| d17 | 77.07 | 1.00 | 25.05 |
| d22 | 60.98 | 51.17 | 1.08 |

TABLE 1

| Conditional expression | Lens pair LB | | |
|---|---|---|---|
| Example 1 | | | |
| (1) | First lens unit | L2 | L3 | 0.0006 |
| | | L7 | L8 | 0.0031 |
| | Second lens unit | L14 | L15 | 0.0108 |
| | Third lens unit | L17 | L18 | 0.0108 |
| | Fourth lens unit | L20 | L21 | 0.0108 |
| | | L24 | L25 | 0.003 |
| (2) | 0.000395 | | |
| (3) | 0.376 | | |
| Example 2 | | | |
| (1) | First lens unit | L2 | L3 | 0.0006 |
| | | L4 | L5 | 0.0061 |
| | Second lens unit | L9 | L10 | 0.0108 |
| | Third lens unit | L11 | L12 | 0.0031 |
| | Fourth lens unit | L13 | L14 | −0.0012 |
| | | L16 | L17 | 0.0010 |
| (2) | −0.000963 | | |
| (3) | 0.552 | | |
| Example 3 | | | |
| (1) | First lens unit | L1 | L2 | −0.0005 |
| | Second lens unit | L9 | L10 | 0.0000 |
| | Third lens unit | L12 | L13 | 0.0000 |
| | Fourth lens unit | L15 | L16 | 0.0000 |
| | | L17 | L18 | −0.0005 |
| | | L19 | L20 | 0.0003 |
| (2) | 0.0000748 | | |
| (3) | 0.423 | | |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-232491, filed Nov. 17, 2014, which is hereby incorporated by reference herein in its entirety.

What is claimed is:

1. A zoom lens, comprising, in order from an object side to an image side:
   a first lens unit having a positive refractive power;
   a second lens unit having a negative refractive power;
   a third lens unit having a negative refractive power; and
   a fourth lens unit having a positive refractive power,
   the second lens unit and the third lens unit being configured to move along loci different from each other during zooming so that an interval between adjacent lens units is changed, wherein at least one lens unit of the first lens unit, the second lens unit, the third lens unit, or the fourth lens unit comprises a positive lens and a negative lens that are arranged adjacent to each other, and wherein materials for the positive lens and the negative lens satisfy the following conditional expression:

$$-0.0015 \leq (\theta IRP - \theta IRN)/(\nu IRP - \nu IRN) < 0.0150$$

where, when a refractive index of a lens material at a wavelength of 400 nm is N400, a refractive index of a lens material at a wavelength of 1,050 nm is N1050, a refractive index of a lens material at a wavelength of 1,700 nm is N1700, and an Abbe number νIR and a partial dispersion ratio θIR of a lens material are νIR=(N1050−1)/(N400−N1700) and θIR=(N400−N1050)/(N400−N1700), respectively, νIRP and θIRP represent an Abbe number and a partial dispersion ratio of the material for the positive lens, respectively, and νIRN and θIRN represent an Abbe number and a partial dispersion ratio of the material for the negative lens, respectively.

2. A zoom lens according to claim 1, further comprising an aperture stop, wherein at least one lens unit arranged on the object side of the aperture stop comprises a positive lens and a negative lens that are arranged adjacent to each other, wherein materials for the positive lens and the negative lens satisfy the following conditional expression:

$$-0.0015 \leq (\theta IRP - \theta IRN)/(\nu IRP - \nu IRN) < 0.0150,$$

wherein at least one lens unit arranged on the image side of the aperture stop comprises a positive lens and a negative lens that are arranged adjacent to each other, and wherein materials for the positive lens and the negative lens satisfy the following conditional expression:

$$-0.0015 \leq (\theta IRP - \theta IRN)/(\nu IRP - \nu IRN) < 0.0150.$$

3. A zoom lens according to claim 1, wherein each of the first lens unit, the second lens unit, the third lens unit, and the fourth lens unit comprises a positive lens and a negative lens that are arranged adjacent to each other, and wherein materials for the positive lens and the negative lens satisfy the following conditional expression:

$$-0.0015 \leq (\theta IRP - \theta IRN)/(\nu IRP - \nu IRN) < 0.0150.$$

4. A zoom lens according to claim 1, wherein the following conditional expression is satisfied:

$$0.3 < F1M/FTM < 0.8$$

where F1M represents a focal length of the first lens unit at a wavelength of 1,050 nm, and FTM represents a focal length of the zoom lens at a telephoto end at a wavelength of 1,050 nm.

5. A zoom lens, comprising, in order from an object side to an image side:
 a first lens unit having a positive refractive power;
 a second lens unit having a negative refractive power;
 a third lens unit having a negative refractive power; and
 a fourth lens unit having a positive refractive power,
 the second lens unit and the third lens unit being configured to move along loci different from each other during zooming so that an interval between adjacent lens units is changed,
wherein the following conditional expression is satisfied:

$$0.0005 < (F1L - F1M)/F1M < 0.005$$

where F1M represents a focal length of the first lens unit at a wavelength of 1,050 nm, and F1L represents a focal length of the first lens unit at a wavelength of 1,700 nm.

6. A zoom lens according to claim 5, wherein the following conditional expression is satisfied:

$$0.3 < F1M/FTM < 0.8$$

where F1M represents a focal length of the first lens unit at a wavelength of 1,050 nm, and FTM represents a focal length of the zoom lens at a telephoto end at a wavelength of 1,050 nm.

7. An image pickup apparatus, comprising:
 a zoom lens; and
 a solid-state image pickup element configured to receive light from an image formed by the zoom lens,
 the zoom lens comprising, in order from an object side to an image side:
  a first lens unit having a positive refractive power;
  a second lens unit having a negative refractive power;
  a third lens unit having a negative refractive power; and
  a fourth lens unit having a positive refractive power,
  the second lens unit and the third lens unit being configured to move along loci different from each other during zooming so that an interval between adjacent lens units is changed,
 wherein at least one lens unit of the first lens unit, the second lens unit, the third lens unit, or the fourth lens unit comprises a positive lens and a negative lens that are arranged adjacent to each other, and
 wherein materials for the positive lens and the negative lens satisfy the following conditional expression:

$$-0.0015 \leq (\theta IRP - \theta IRN)/(\nu IRP - \nu IRN) < 0.0150$$

where, when a refractive index of a lens material at a wavelength of 400 nm is N400, a refractive index of a lens material at a wavelength of 1,050 nm is N1050, a refractive index of a lens material at a wavelength of 1,700 nm is N1700, and an Abbe number νIR and a partial dispersion ratio θIR of a lens material are νIR=(N1050−1)/(N400−N1700) and θIR=(N400−N1050)/(N400−N1700), respectively, νIRP and θIRP represent an Abbe number and a partial dispersion ratio of the material for the positive lens, respectively, and νIRN and θIRN represent an Abbe number and a partial dispersion ratio of the material for the negative lens, respectively.

8. An image pickup apparatus, comprising:
 a zoom lens; and
 a solid-state image pickup element configured to receive light from an image formed by the zoom lens,
 the zoom lens comprising, in order from an object side to an image side:
  first lens unit having a positive refractive power;
  a second lens unit having a negative refractive power;
  a third lens unit having a negative refractive power; and
  a fourth lens unit having a positive refractive power,
  the second lens unit and the third lens unit being configured to move along loci different from each other during zooming so that an interval between adjacent lens units is changed,
 wherein the following conditional expression is satisfied:

$$-0.005 < (F1L - F1M)/F1M < 0.005$$

where F1M represents a fecal lea of the first lens unit at a wavelength of 1,050 nm, and F1L represents a focal length of the first lens unit at a wavelength of 1,700 nm.

* * * * *